Figure 1:
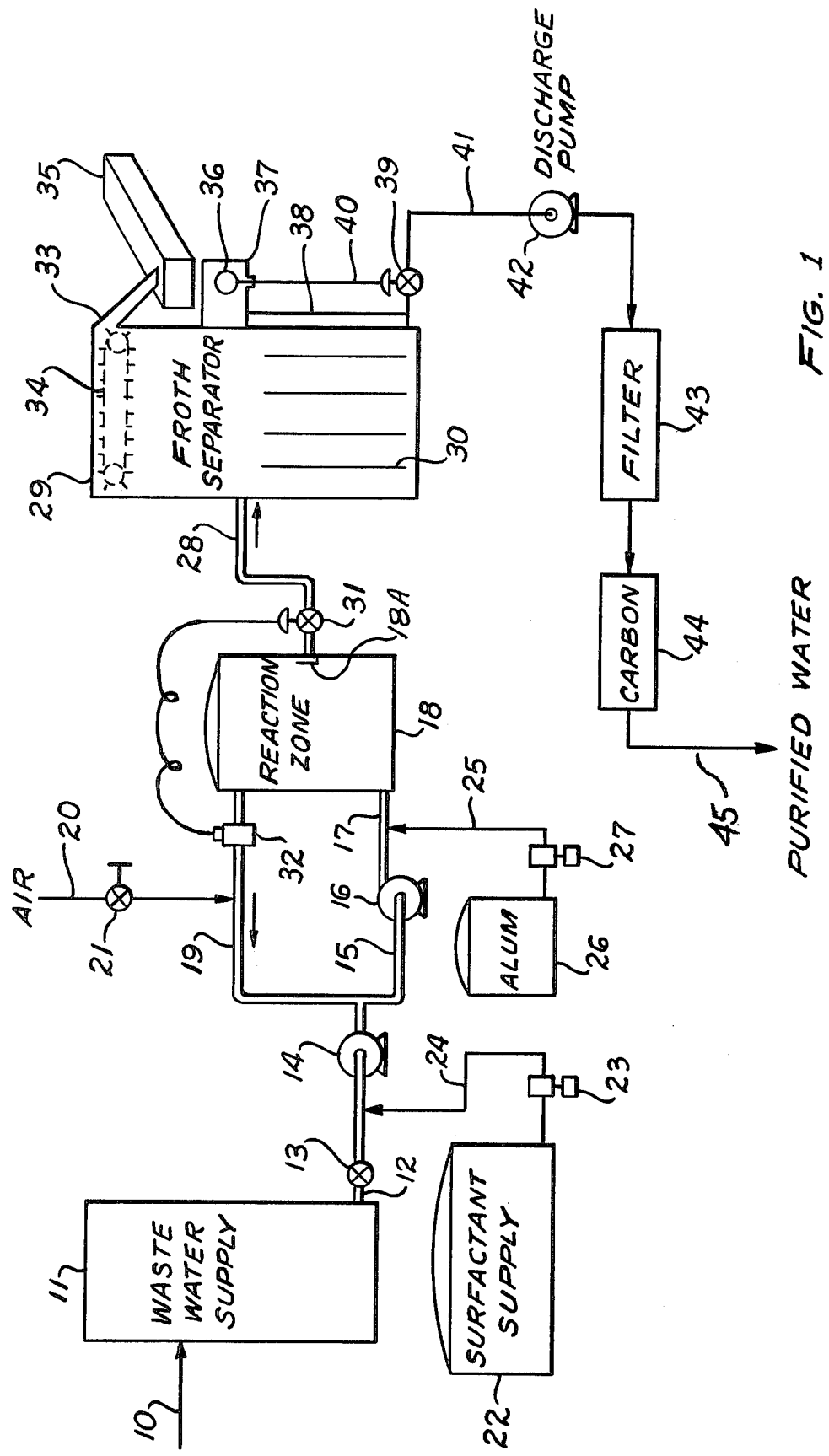

United States Patent [19]

Deane

[11] 4,092,242
[45] May 30, 1978

[54] WASTE WATER PURIFICATION SYSTEM

[75] Inventor: Thomas N. Deane, New Orleans, La.

[73] Assignee: The Redux Corporation, St. Louis, Mo.

[21] Appl. No.: 587,426

[22] Filed: Jun. 16, 1975

[51] Int. Cl.² ............... B01D 13/00; B01D 17/04; B03D 1/26
[52] U.S. Cl. .................. 210/23 F; 210/43; 210/44; 210/51; 210/127; 210/206; 210/221 P
[58] Field of Search ............... 210/23 F, 43, 44, 192, 210/221 M, 221 P, 51, 54, 59, 63 R, 127, 206, 207

[56] References Cited

U.S. PATENT DOCUMENTS

| Re. 28,323 | 1/1975 | Silva | 210/44 |
| 2,793,185 | 5/1957 | Albrektsson et al. | 210/44 |
| 3,147,217 | 9/1964 | Halton | 210/221 P X |
| 3,259,567 | 7/1966 | Dunning et al. | 210/221 P X |
| 3,434,968 | 3/1969 | Lowe | 210/44 |
| 3,510,001 | 5/1970 | Baer et al. | 210/192 |
| 3,583,909 | 6/1971 | Block | 210/44 |
| 3,673,065 | 6/1972 | Anderson | 210/44 X |
| 3,733,265 | 5/1973 | Kraus et al. | 210/23 |
| 3,764,013 | 10/1973 | Eisenmann | 210/44 X |

Primary Examiner—Charles N. Hart
Assistant Examiner—Robert H. Spitzer
Attorney, Agent, or Firm—Rogers, Eilers & Howell

[57] ABSTRACT

Waste water containing synthetic detergents (syndets) such as water soluble sulfonates or ethoxylated alcohols is reclaimed for re-use by emulsifying with a water insoluble, high molecular weight, anionic surface active oil, then breaking the emulsion by conventional physical or chemical methods, thereby producing a coherent floc which occludes the syndet and all insoluble matter suspended in the water, then separating the floc from the purified water in a coherent mass.

7 Claims, 1 Drawing Figure

WASTE WATER PURIFICATION SYSTEM

This invention relates to a process of reclaiming waste water and to an apparatus suitable for use in said process. Heretofore, many attempts have been made to reclaim the waste wash water, e.g., from laundry operations, particularly in areas where there is a shortage of water and the cost of water is high as a consequence thereof. Likewise, discharge of such waste water into streams and lakes has resulted in a pollution menace. Before the advent of syndets, i.e., synthetic detergents, primarily the alkyl aryl sulfonates and nonionics, laundry and similar wash operations were conducted with soaps of fatty acids, usually sodium oleate, stearate, palmitate and fatty acids in general as their sodium or potassium salts. Sodium carbonate, sodium borate, trisodium phosphate, tetrasodium pyrophosphate and sodium silicate were also often present with the soaps to reinforce and accelerate their detergent action in removing soil from fabrics. The waste water from these operations could be recovered when desired, by simply neutralizing the alkalinity of the water with, for instance, aluminum sulfate, thereby separating the fatty acids along with aluminum soaps and aluminum hydroxide when alum was used as the neutralizing agent.

My invention is illustrated by a drawing which is a diagram of an apparatus for carrying out the process.

With the advent of the syndets, particularly the sodium alkyl aryl sulfonates of 10 to 16 carbon atoms and sodium lauryl sulfates and lauryl sulfates of 12 carbon atoms and the nonionics, such as ethoxylated alcohols, the previous methods of water reclaiming and purification were found ineffective owing to the water soluble nature of the metal salts of the organic sulfonates and sulfates employed in the syndets. When waste water from such operations is treated with alum, or other flocing agents, the carbonates and alum reactive chemicals are rendered insoluble but the clarification is slow and incomplete because the syndets remain active surfactants, suspending the soils and insoluble chemicals. Likewise when such wash waters containing syndets are purified by ultra filtration, the insoluble solids, bacteria and larger organic molecules are removed but the syndets carry through with the purified effluent rendering such water unsatisfactory for effective rinsing. When electrochemical purification is employed, that method also is unable to or requires excessive time to break the bond between the syndet and water, so the effluent is too "sudsy" for use as an effective rinse water.

A search of the patent literature revealed a number of patents directed to the solution of this problem, but none provided a process which met the requirements for a commercially satisfactory process, namely: (1) rapid action to allow recycle involvement of minimum volumes of water, preferably a recycle rate equal to the use demand rate; (2) separation of opaque suspended matter providing water of rinse water quality; (3) low cost of reagents; (4) simple, inexpensive apparatus. Among the patents studied were the following: U.S. Pat. Nos. 2,613,180; 2,695,710; 2,762,681; 3,147,217; 3,200,069; 3,389,081; 3,583,909; 3,817,870.

One object of my invention is to provide a process for reclaiming waste wash water which will meet the foregoing requirements with a minimum of apparatus and at a cost which will compete with purchased city water. Another object is to provide a process which will reclaim water while at elevated washing temperatures, thereby producing warm water for recycle and saving part of the fuel required to heat it for the washing operation, for laundry purposes usually about 140° F. Another object of the invention is to produce a soap floc which, owing to its concentrated form, can be easily disposed of, for example, by burning in a furnace with other fuel or removed as a solid suitable for land fill.

I have now discovered that the foregoing objects can be achieved by injecting into the waste water a small controlled amount of an oil, comprising a water insoluble surface acting agent which is a high molecular weight organic acid or its salt of a metal of Group 2 of the Periodic Table, the acid being selected from the class of the sulfonic acids, and their byproduct green acids, the phosphoric acids, the alkyl phenates and the carboxylic acids of upwards of 18 carbon atoms, generally 20 to 40 carbon atoms. Hereinafter these substances are referred to as "surfactant." In the presence of the synthetic detergent components in the water, the surfactant forms an emulsion aided by agitation at and immediately after the point of injection. This operation can be carried out batchwise but the rapid separation possible with this invention lends itself to continuous flow treating. I therefore prefer to operate continuously, injecting the surfactant into a stream of waste water entering a mixer. The amount of surfactant required can vary somewhat, depending on the amount of detergent in the waste water. Usually the volume of surfactant added is related to the weight of the active detergent present by a factor of 0.20 times to an upper limit of about 100 times (at which point the emulsion inverts). An effective amount being a ratio of 1 part of surfactant to 2 parts of active detergent content by weight. In general, when treating a mixture of waste wash water and rinse water, e.g., rejected from the usual laundry operation, the amount of surfactant required will be about 100 to 250 mg. per liter of water treated. If insufficient surfactant is used, the floc later produced will possess insufficient adhesiveness and fail to separate from the water rapidly and completely. Accordingly, it is desirable to add just the minimum amount to produce a coherent floc, up to the point of inversion. Except for cost, excess surfactant is not harmful.

The emulsion is next broken by treating with commonly used flocing chemicals such as alum, zinc chloride or iron chloride or combinations of these with polyelectrolytes or by electrochemical or ultra filtration methods well known to the art. In each case, the surfactant has captured or sequestered the syndet by mutual solubility so that as the emulsion is broken, the syndet is carried from the water with the surfactant.

I have also for speed of operation and simplicity and because of the helpfully adsorptive aluminum oxide produced, invented a specialized apparatus for using alum (aluminum sulfate) in implementing the emulsion breaking function of this invention. In the apparatus, aluminum sulfate in a water solution of any convenient dilution is injected into the wash water surfactant emulsion. Being strongly acidic, the alum neutralizes the alkaline minerals (such as sodium carbonate and silicate) which have been left in the wash water from having been compounded into the syndet containing detergent formula. Sufficient alum is added to give the water a slightly acid reaction, e.g., pH 5 to 6.5. When carbonates have been included in the detergent formula, a gelatinous precipitate of aluminum oxide is formed which acts as an adsorbant for dyes and other soils contained in the wash water.

Simultaneously with the formation of aluminum hydroxide, the surfactant emulsion is broken and the collodial particles of the surfactant and associated oil and snydets along with the aluminum oxide become the coherent floc hereinabove referred to. From this it will be observed that the process involves a complex combination of chemical and physio-chemical reactions wherein the most important, from the standpoint of a successful process is the adsorption of the syndet — usually, but not limited to, alkyl aryl sulfonate in combination with the added surfactant oil, through a mutual solubility or covalent bonding reaction.

The water insoluble sulfonic acids employed in my surfactant can be made by sulfonating a petroleum lubricating oil fraction with oleum or $SO_3$ in a manner well known to the art or by sulfonating an alkyl benzene of the desired molecular weight, e.g., benzene alkylated with butylene dimer or trimer. One such process is described in U.S. Pat. No. 2,746,980. A suitable oil fraction for this purpose may have a molecular weight of 400 to 600 and a yellow to red color. A fraction commonly used is known as 480 neutral oil. After sulfonation, the oil is separated from acid sludge and the sulfonic acids extracted with alcohol and water, then neutralized with lime to form the calcium soap. Or the sulfonic acid can be neutralized with sodium hydroxide to form the sodium soap which can be extracted from the oil with aqueous alcohol, then converted to the calcium, barium or magnesium salt by double decomposition with the corresponding Group 2 metal halide. The sulfonate obtained in this manner usually contains 50 to 60% by weight of unsulfonated petroleum hydrocarbon oil. To reduce the cost, additional oil can be added, reducing the sulfonate content to 15 to 30 percent. For this purpose I can use a non-volatile petroleum fraction such as 60 pale oil, deodorized kerosene, or "Iso-par M" TM which is an odorless petroleum fraction boiling at 410° to 480° F. with a flash point above 170° F. Addition of about 1 to 5 percent by weight of viscous polybutene of high molecular weight adds adhesiveness to the resulting floc, if desired.

Other water insoluble surfactants are the phosphonic acids prepared by reacting an olefin such as polybutene or polypropylene with phosphorous sulfide then hydrolyzing the product to eliminate $H_2S$ in a manner well known in the art. Oleic acid or calcium or barium oleate in mineral oil solution can also be used, as can phenyl stearic acid and the calcium salt of polymerized napthenic acids of 13 to 23 carbon atoms, the so-called "bicyclic acids," and the so-called green acid by-products formed in the sulfonation of petroleum fractions. All the above surfactants are preferentially oil soluble owing to their high lipophyllic character which can be expressed as a hydrophyllic-lipophyllic balance (HLB) of less than 1 on a scale in which the HLB of laundry detergent equals above 20. Whichever chemical is used, my reference to "surfactant" is meant to describe the one used as diluted ready for addition to the waste water.

EXAMPLE

The following example will demonstrate the process and its results:

To 25 gallons of hot water in the washing machine was added 100 gms. of detergent having the following formula:

| | |
|---|---|
| Sodium alkyl aryl sulfonate | 20% |
| Sodium carbonate | 25% |
| Sodium metasilicate | 6% |
| Brightener | 1% |
| Carboxy methyl cellulose | 1% |
| Water | 47% |

A 10 pound load of soiled clothing was added and washing continued for 30 minutes at about 140° F water temperature. The waste water was then withdrawn and spun from the clothes, after which the clothes were rinsed with 25 gallons of fresh water, either tap water or purified recycle water. The rinse water was spun from the clothes and combined with the waste wash water. About 500 gallons of discarded water was accumulated in this manner. It will be observed that the water will contain about 105 milligrams per liter of the alkyl sulfonate.

This water was next drawn into a centrifugal pump at the rate of 45 gal. per minute, along with surfactant, in this a case a 25% active solution of high molecular weight, neutral calcium sulfonate, at the rate of 250 milligrams per liter or about 44 grams per minute. Emulsification takes place in the pump which forces the water into a reaction vessel of 80 gallons capacity. Between the pump and the reaction vessel, a 20% solution of alum was added at the rate of 150 gms. per minute. The reaction vessel was maintained at about 20 lbs. per sq. in. pressure and air was injected therein in excess of that which will dissolve in the water at this pressure. The rate of feeding alum was maintained by a metering pump or proportioning pump to give an acidity to the water of about 5 to 6.5 pH. This was controlled automatically by a pH meter arranged to sample the reaction vessel. The volume of water in the reaction vessel was controlled to provide a residence time of ½ to 2 minutes.

The stream next flowed through a pressure reducing valve to a floc separator where dissolved air was released and the floc was floated to the surface, collecting there as a pasty, coherent layer containing 80 to 90 percent of water, to be removed by scraping manually or mechanically. Care was taken to avoid the introduction of un-dissolved air to the separator because of excessive turbulence set up therein. The clear, reclaimed water was withdrawn from the bottom of the separator. It can be passed through a screen or coarse filter to remove any bits of accidental floc, then passed through a carbon filter to collect any trace of oil, dyes and other organic impurities and finally sterilized, for example, by ultraviolet light, ozone or chlorine. Following is an analysis of the purified water produced hereinabove:

| | |
|---|---|
| Suspended solids | 5 PPM |
| Dissolved solids | 1.5% maximum |
| Bacteria (culture) | None |
| Virus | None |
| Odor (olefactory test) | None |
| pH | 6 – 7 |
| Hardness | None |
| Softness (alum test) | .005% |
| Clarity (nephelometer) | Clear |
| Color | Water white |
| Heavy metals | 2 PPM |
| Mercury | None |

Referring now to the drawing, FIG. 1, used wash water is charged by line 10 to supply tank 11 wherein a sufficient volume, e.g., 500 gallons, is retained to average or equalize the supply which may vary in composition from time to time as the laundry machines are discharged periodically. The water then flows from tank 11 by line 12 through check valve 13 which prevents any reverse flow to the tank, thence by pump 14 and line 15 to circulating pump 16 and by line 17 to reaction zone 18. Reactor 18 may have a volume of about 50 to 100 gallons in an average installation, providing a residence time of about ½ minute to 5 minutes, 1 minute having been found very satisfactory.

From an upper level in tank 18, the water is then recycled by lines 19 and 15 back to the inlet of pump 16 which is preferably of the centrifugal type with sufficient capacity to recycle the water at a rate of 2 to 10 times the rate of flow from feed tank 11. Air is injected into the circulating stream by line 20, controlled by metering valve 21 set to introduce air at a rate sufficient to saturate the water in reactor 18. Into the line leading to pump 14 is continuously fed a stream of surfactant oil from supply tank 22 by metering pump 23 through line 24. In pump 14 it becomes thoroughly emulsified with the water from line 12. Inasmuch as the amount of surfactant is quite small, e.g., 1 quart per 1000 gallons of water treated, pump 23 provides an accurate control for the purpose and can be adjusted to provide any desired constant rate of injection. The surfactant is rapidly emulsified and dispersed in the water by the turbulence in pump 16 and by the dispersing action of the residual soaps and detergents in the waste water.

There is next introduced into the stream, by line 25, a solution of alum (aluminum sulfate) from supply tank 26 controlled by metering pump 27. A 20% solution of alum in water is convenient for the purpose. The rate of alum injection is adjusted in relation to an assumed 5X recycle rate and the usual amount of detergent in the water or about 174 mg. per liter of waste water when the wash water detergent solids content is around 265 milligram per liter. The alum coagulates the soaps and detergents in the waste water, forming a gelatinous precipitate of aluminum hydroxide and aluminum soaps which are insoluble in the water. These form a highly adsorbant floc which is less dense than water and floats to the top in reactor 18. This precipitate is recycled with air and water to pump 16 where it encounters additional surfactant and alum in line 17.

The system, including the reactor 18, pump 16 and recycle lines 15, 17, 19, is maintained under pressure to accelerate the solution of air in the water and dispersed floc. A pressure of about one atmosphere gage is effective for this purpose, e.g., 10 to 20 psi. gage. At a later stage in the process when pressure is released, the dissolved air escapes from solution in the form of microscopic bubbles which occlude on their surfaces. the dispersed solids and oils on the bubble surfaces to form the floc which floats to the surface, leaving the water clarified. Feed pump 14 maintains the pressure on the system for this purpose. A centrifugal pump or other type equipped with a spring loaded bypass set at the desired pressure, can be used, as is well known in the art. Solution of the air is aided by the residence time in the reactor and by the high recycle ratio.

Agitation and air absorbtion in the reaction zone may also be effected by injecting the liquid stream into the top of the reaction zone through a high velocity nozzle impinging upon the surface of the liquid in the zone. The liquid in the zone may be maintained at a fixed level below the top of the pressurized apparatus by a float regulated injection of pressurized air.

From the reactor 18 the water flows by line 28 to froth separator 29 which is a vertical tank or tower, preferably of rectangular cross section, wherein the floc or froth rises to the top and the clear treated water settles to the bottom. Water transferred to separator 29 is withdrawn from a mid-point of reactor 18 behind baffle 18A, which prevents escape of air. Baffles 30 in separator 29 assist in settling and clarification of the water by preventing turbulence. Flow through line 28 is controlled by a diaphragm valve 31 in response to pH meter 32 which senses the hydrogen ion concentration in the recycle line from reactor 18. For best operation, it is desirable to maintain the hydrogen ion concentration of the treated water in reactor 18 between pH-5 and pH 6.5. If the pH rises above 6.5, the meter 32 restricts the flow through discharge line 28 until the alum introduced at 25 reduces it to the acceptable range.

At the top of separator 29 the froth collects in a layer and overflows at 33, assisted by a travelling rake 34 or other device to urge the pasty mass into trough 35 leading to disposal. The froth level in 29 can be maintained by a float 36 in level box or reservoir 37 connected to the bottom of tank 29 by line 38. The float actuates discharge valve 39 through connection 40. The clarified water flows by line 41 and pump 42 to filter 43. This can be a simple fabric or open cell sponge type filter to remove accidental bits of floc, etc., or it can be a sand type filter commonly used in water treating plants. Since the water at this point is clear, filter 43 serves no significant clarification function. From 43 the water flows to a final activated carbon or charcoal filter 44 where any residual odors resulting from traces of hydrocarbons, etc. are adsorbed. The completely purified water, free of detergents and all dispersed solids and insolubles, flows by line 45 leading to the water supply for further laundering operations. For this purpose it may be heated and/or treated with disinfectants to insure freedom from trace amounts of pathogens which may have escaped the floc extraction stage of the process.

Although I have described my invention with respect to a specific design of apparatus, I may employ other methods and devices for performing the process. Thus, the pH controller can actuate the metering pump for introducing alum solution to obtain the desired acidity in the reactor. I have also operated the reactor, flowing in at the top, preferably through a spray nozzle, and out the bottom, recycling from top to bottom and controlling the level therein at a mid point by means of a float operated valve. The level in the floc separator 29 can also be controlled by a simple overflow weir set at the desired level and connected to the bottom of the separator tower 29, thus eliminating the need for a float control. In a modification of the apparatus of FIG. 1 the liquid stream is injected into the top of the reaction zone 18 through a high velocity nozzle. The air is injected into the reaction zone 18 through line 20 and valve 21, which are controlled by a float to regulate the level of the liquid in reaction zone 18.

Further modifications of my invention include the use of molecular filtration (ultra filtration or reverse osmosis) and electrochemical means. When employing ultra filtration (U/F) or reverse osmosis (R/O) I omit the step in which the inorganic electrolyte is added. The low HLB surface active agent and oil causes the high HLB detergent to form mycels so that they no longer remain dispersed as a colloidal solution. Both U/F and R/O reject only a fraction of high HLB detergent molecules when dispersed as a colloidal solution in the water. When, by my process, they are collected into mycels they no longer act individually and are therefore not present at the surface of the U/F or R/O membrane. As a result, the permeate so produced has a far lower concentration of surface active agents (detergents and soaps) than is found when detergent mixtures are treated without the addition of the low HLB mixture. I thereby overcome the problem of organics and foaming in the permeate stream.

When employing electrochemical means, I can either omit or include the step in which the inorganic electrolyte is added. If that step is included, a carbon cathode and noble metal anode (or noble metal plated anode) are used to treat the flocced effluent from the reaction zone. When current is passed through this system, the resultant formation of gaseous hydrogen and oxygen float the floc particles to the surface and a froth similar in nature to that obtained with dissolved air flotation is formed. If the addition of the inorganic electrolyte is omitted, an aluminum anode and carbon cathode is used. When current is passed through the surfactant-waste water emulsion, aluminum ions thereby produced react with the surfactant-detergent mycels to break the emulsion and produce a floc in a manner similar to the addition of an inorganic electrolyte. The simultaneous production of gaseous hydrogen and oxygen float these coloidal particles to the surface as described above.

Other modification can of course be readily made by one skilled in the art without departing from the spirit of the invention and the scope of the appended claims.

I claim:

1. The process of reclaiming waste water from a washing operation employing syndets which comprises adding to said waste water a water-insoluble anionic surfactant oil, emulsifying said syndets and added surfactant by the action of the detergents contained in said waste water, and breaking said emulsion to produce clear water suitable for reuse in washing and rinsing in the washing operation.

2. The process of claim 1 wherein the amount of surfactant added to the waste water is from 50 to 5000 parts per million parts of water.

3. The process of claim 1 wherein the emulsion produced is separated by breaking the emulsion by adding aluminum sulfate or other metal salts in a stoichiometric quantity to react with the syndets and surfactants in the wash water being treated.

4. The process of claim 1 wherein the emulsion produced is separated by extracting the water from the emulsion by passing it through an ultra filtration membrane which retains all solids and the syndet sequestered by the surfactant.

5. The process of claim 1 wherein the emulsion produced is separated by breaking the emulsion by electrochemical means with an electric current at a voltage and amperage appropriate to the conductivity and chemical composition of the fluid to produce a cohesive and hydrophilic floc which is easily removed from the surface of the purified water.

6. The process of claim 1 wherein the waste water contains syndet active solid materials and the amount of surfactant added is approximately 0.20 to 100 times the mean of the total active solids anticipated in the wash water being treated.

7. The process of claim 1 wherein the emulsion produced is separated by breaking the emulsion by addition of a reactant selected from the group consisting of calcium, aluminum, and iron salts.

* * * * *

UNITED STATES PATENT OFFICE
CERTIFICATE OF CORRECTION

Patent No. 4,092,242  Dated May 30, 1978

Inventor(s) Thomas N. Deane

It is certified that error appears in the above-identified patent and that said Letters Patent are hereby corrected as shown below:

At column 2, line 11, change "acting" to -- active --.
At column 2, line 15, change "phosphoric" to -- phosphonic --.
At column 2, line 46, change "flocing" to -- floccing --.
At column 3, line 55, change "lipophyllic" to --lipophylic--.
At colume 3, line 56, change "hydrophyllic - lipophyllic" to --hydrophylic - lipophylic --.
At column 4, line 21, change "45" to -- 4.5--.
At column 4, line 23. change "44" to -- 4.4--.
At column 4, line 26, change "80" to -- 8.0--.
At column 4, line 27, change "150" to -- 15.0--.
At column 6, line 47, change "mid" to -- mid- --.

Signed and Sealed this

Sixth Day of March 1979

[SEAL]

Attest:

RUTH C. MASON
*Attesting Officer*

DONALD W. BANNER
*Commissioner of Patents and Trademarks*